(12) United States Patent
Shimada et al.

(10) Patent No.: US 11,537,188 B2
(45) Date of Patent: Dec. 27, 2022

(54) INTERFACE CIRCUIT, INFORMATION PROCESSING APPARATUS, DISPLAY METHOD, AND NON-TRANSITORY COMPUTER-READABLE MEDIUM

(71) Applicant: NEC Platforms, Ltd., Kawasaki (JP)

(72) Inventors: Tsuyoshi Shimada, Kanagawa (JP);
Takeo Miyajima, Kanagawa (JP);
Hiromu Matsushima, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/423,596

(22) PCT Filed: Dec. 6, 2019

(86) PCT No.: PCT/JP2019/047724
§ 371 (c)(1),
(2) Date: Jul. 16, 2021

(87) PCT Pub. No.: WO2020/153012
PCT Pub. Date: Jul. 30, 2020

(65) Prior Publication Data
US 2022/0113777 A1 Apr. 14, 2022

(30) Foreign Application Priority Data
Jan. 21, 2019 (JP) .............................. JP2019-007701

(51) Int. Cl.
*G06F 1/26* (2006.01)
*G06F 13/42* (2006.01)
*G06F 11/32* (2006.01)

(52) U.S. Cl.
CPC ............ *G06F 1/266* (2013.01); *G06F 11/324* (2013.01); *G06F 13/4282* (2013.01); *G06F 2213/0042* (2013.01)

(58) Field of Classification Search
CPC ...... G06F 1/189; G06F 1/266; G06F 11/3027; G06F 11/3041; G06F 11/3051;
(Continued)

(56) References Cited

U.S. PATENT DOCUMENTS 8,082,368 B2 * 12/2011 Hsu ...................... H04L 43/0811
709/224
8,184,933 B1 * 5/2012 Aybay .................. G02B 6/3895
385/100
(Continued)

FOREIGN PATENT DOCUMENTS

JP 3172051 U 12/2011
JP 2017-187933 A 10/2017
(Continued)

OTHER PUBLICATIONS

International Search Report for PCT Application No. PCT/JP2019/047724, dated Jan. 7, 2020.

*Primary Examiner* — Thomas J. Cleary

(57) ABSTRACT

A user can easily determine, before connecting, whether an electronic device is able to operate when connected to an interface circuit and whether power can be supplied. The interface circuit includes a controller, a connector for connecting to an electronic device, and a display. The controller displays an operation mode and a power supply mode supported by the interface circuit on the display with the electronic device not connected to the connector.

10 Claims, 13 Drawing Sheets

(58) Field of Classification Search
CPC ............. G06F 11/3055; G06F 11/3058; G06F 11/324; G06F 11/325; G06F 11/327; G06F 11/328; G06F 13/4282; G06F 2213/0042; G06F 3/00; G06F 13/38; G06F 13/42; H01R 2201/06

See application file for complete search history.

(56) References Cited

U.S. PATENT DOCUMENTS

| | | | |
|---|---|---|---|
| 9,619,979 B1 | 4/2017 | Montero et al. | |
| 10,061,280 B2* | 8/2018 | Shpiro | G06F 1/266 |
| 10,690,863 B1* | 6/2020 | Mahdi Hayder | G06F 13/4063 |
| 11,101,736 B2* | 8/2021 | Waters | H02J 13/00016 |
| 2003/0218550 A1* | 11/2003 | Herrmann | H04B 3/56 |
| | | | 323/241 |
| 2005/0021881 A1* | 1/2005 | Asano | G06F 13/102 |
| | | | 710/19 |
| 2005/0182876 A1* | 8/2005 | Kim | G06F 13/385 |
| | | | 710/100 |
| 2007/0083905 A1* | 4/2007 | Lee | G09G 5/006 |
| | | | 725/105 |
| 2009/0061678 A1* | 3/2009 | Minoo | G06F 21/44 |
| | | | 439/502 |
| 2009/0167286 A1* | 7/2009 | Naylor | G01R 31/58 |
| | | | 324/66 |
| 2011/0219147 A1* | 9/2011 | Diab | G06F 12/00 |
| | | | 711/E12.001 |
| 2012/0064772 A1* | 3/2012 | Pocrass | H02J 7/0042 |
| | | | 439/625 |
| 2012/0243554 A1* | 9/2012 | Sybesma | H04L 43/12 |
| | | | 370/464 |
| 2012/0297207 A1* | 11/2012 | Carlsen | G06F 13/4081 |
| | | | 713/300 |
| 2013/0267120 A1* | 10/2013 | Rothkopf | G06F 13/409 |
| | | | 439/620.21 |
| 2014/0156879 A1* | 6/2014 | Wong | G06F 11/3055 |
| | | | 710/19 |
| 2014/0173141 A1* | 6/2014 | Waters | G06F 1/266 |
| | | | 710/16 |
| 2015/0015403 A1* | 1/2015 | LeMaistre | G08B 5/22 |
| | | | 340/654 |
| 2015/0026366 A1* | 1/2015 | Altmann | G06F 13/4022 |
| | | | 710/14 |
| 2015/0168471 A1* | 6/2015 | Truong | G06F 13/409 |
| | | | 324/66 |
| 2015/0334166 A1* | 11/2015 | Warden | H04L 63/20 |
| | | | 709/217 |
| 2016/0349292 A1* | 12/2016 | Atkinson | G01R 31/58 |
| 2017/0220444 A1 | 8/2017 | Montero et al. | |
| 2017/0242804 A1* | 8/2017 | Voor | G06F 3/023 |
| 2017/0294832 A1 | 10/2017 | Aoki | |
| 2017/0373882 A1 | 12/2017 | Doi et al. | |
| 2018/0003743 A1 | 1/2018 | Jenkins et al. | |
| 2018/0121374 A1* | 5/2018 | Inoue | G06F 13/16 |
| 2018/0131847 A1* | 5/2018 | Kokonaski | H04N 5/2252 |
| 2018/0226756 A1 | 8/2018 | Chen | |
| 2018/0287375 A1* | 10/2018 | Su | H02H 1/0084 |
| 2019/0087295 A1* | 3/2019 | Sultenfuss | G06F 13/4081 |
| 2020/0177001 A1* | 6/2020 | Yakame | H01R 13/7175 |

FOREIGN PATENT DOCUMENTS

| | | |
|---|---|---|
| JP | 2017-228226 A | 12/2017 |
| JP | 2018-148621 A | 9/2018 |

* cited by examiner

INTERFACE CIRCUIT, INFORMATION PROCESSING APPARATUS, DISPLAY METHOD, AND NON-TRANSITORY COMPUTER-READABLE MEDIUM

This application is a National Stage Entry of PCT/JP2019/047724 filed on Dec. 6, 2019, which claims priority from Japanese Patent Application 2019-007701 filed on Jan. 21, 2019, the contents of all of which are incorporated herein by reference, in their entirety.

TECHNICAL FIELD

The present disclosure relates to an interface circuit, an information processing apparatus, a display method, and a program.

BACKGROUND ART

Interface circuits of various standards such as Universal Serial Bus (USB) Type-C are used for connecting an information processing apparatus to another information processing apparatus or an electronic device of another type. A USB Type-C interface circuit is a compact interface circuit that can supply not only signal but also power.

Patent Literature 1 describes an electrical connector assembly that can display operation status of a communication interface. The electrical connector assembly described in Patent Literature 1 includes an electrical connector having at least two communication interfaces, each complying with a different communication standard, and a signal indicator implemented on at least one side of the electrical connector. The signal indicators indicate operation status of the two communication interfaces respectively, by means of light-emitting elements emitting light with different colors according to a signal from an electronic device.

CITATION LIST

Patent Literature

Patent Literature 1: Japanese Utility Model Registration No. 3172051

SUMMARY OF INVENTION

Technical Problem

Various electronic devices can be connected to a USB Type-C interface circuit. However, it is up to the manufacturer of the Type-C interface circuit or an information processing apparatus equipped therewith what function to support and how much power to supply in the actual design. Therefore, there is a problem in the interoperability, and there are many cases that even when a physical connection is possible because a connector and a cable are in the same standard, no operation is possible, and a user cannot easily determine whether or not an electronic device is connectable and operable. This type of problem may occur for a similar interface circuit. The technique described in Patent Literature 1 only displays operation status after an electronic device is connected, so a similar problem occurs.

The purpose of the present disclosure is to provide an interface circuit, an information processing apparatus, a display method, and a program that solves the problem described above. The problem discussed above is about making a user easily determine before connecting whether or not an electronic device is able to operate and whether or not power can be supplied when connected to the interface circuit.

Solution to Problem

The interface circuit according to the first example embodiment of the present disclosure includes a connector for connecting to an electronic device, a display unit, and a control unit, and the control unit displays a supported operation mode and a supported power supply mode on the display unit when the electronic device is not connected to the connector.

The information processing apparatus according to the second example embodiment of the present disclosure includes an interface circuit including a connector for connecting to an electronic device, a display unit, and a control unit, and the control unit displays an operation mode and a power supply mode being supported by the interface circuit on the display unit when the electronic device is not connected to the connector.

The display method according to the third example embodiment of the present disclosure includes a detection step of detecting that an electronic device is not connected to a connector for connecting to the electronic device, and a display step of displaying an operation mode and a power supply mode being supported by the interface circuit including the connector, on a display unit, when the detection step detects that the electronic device is not connected to the connector.

The program according to the fourth example embodiment of the present disclosure causes a control computer embedded in or connected to an interface circuit including a connector for connecting to an electronic device, to execute a detection step of detecting that the electronic device is not connected to the connector, and a display step of displaying an operation mode and a power supply mode being supported by the interface circuit when the detection step detects that the electronic device is not connected to the connector.

Advantageous Effects of Invention

According to the present disclosure, an interface circuit, an information processing apparatus, a display method, and a program that solves the above problem can be provided. Therefore, the present disclosure makes a user easily determine before connecting whether or not an electronic device is able to operate and whether or not power can be supplied when connected to the interface circuit.

DESCRIPTION OF EMBODIMENTS

With reference to the drawings, the example embodiments are described below. In the example embodiments, the same reference signs are given to the same or similar elements, and duplicated explanations are omitted. The diagrams described below include a diagram having a unidirectional arrow, however, the arrow clearly indicates a direction of a signal (data), and does not exclude bidirectionality.

First Example Embodiment

With reference to FIG. 1 to FIG. 4, the first example embodiment is described.

Figure 1:
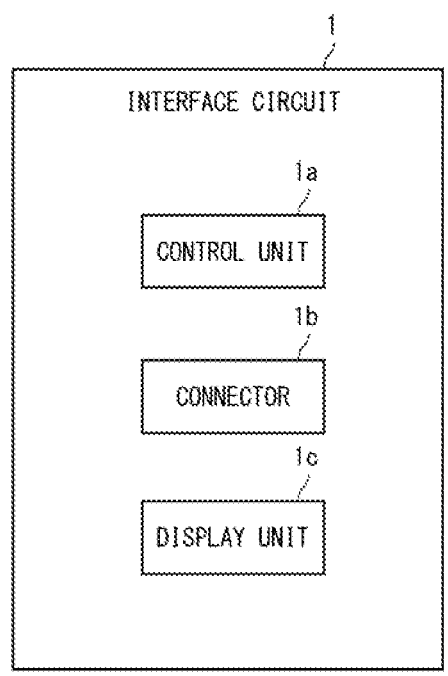
FIG. 1 is a block diagram showing a configuration example of an interface circuit according to the first example embodiment.

A configuration example of an interface circuit according to the first example embodiment is described with reference to FIG. 1. FIG. 1 is a block diagram showing a configuration example of an interface circuit according to the first example embodiment.

As shown in FIG. 1, an interface circuit 1 according to this example embodiment includes a control unit 1a, a connector 1b for connecting to an electronic device, and a display unit 1c. The interface circuit 1 may be an interface circuit of any standard, as long as the connector 1b that complies with the standard is provided.

The control unit 1a displays a supported operation mode and a supported power supply mode (power supply specification) on the display unit 1c when an electronic device is not connected to the connector 1b. In other words, the control unit 1a displays a supported operation mode and a supported power supply mode on the display unit 1c before connecting the electronic device to the connector 1b. The control unit 1a can determine whether or not the electronic device is connected to the connector 1b, and according to the determination result, perform the display control described above.

Here, when only a cable is connected to the connector 1b and the electronic device is not connected to the cable, the control unit 1a similarly performs the display control.

The control unit 1a can be realized by an Integrated Circuit (IC), for example. The control unit 1a can also be realized by a Central Processing Unit (CPU), a working memory, and a non-volatile storage device that stores a program for controlling the entire interface circuit 1.

Figure 2:
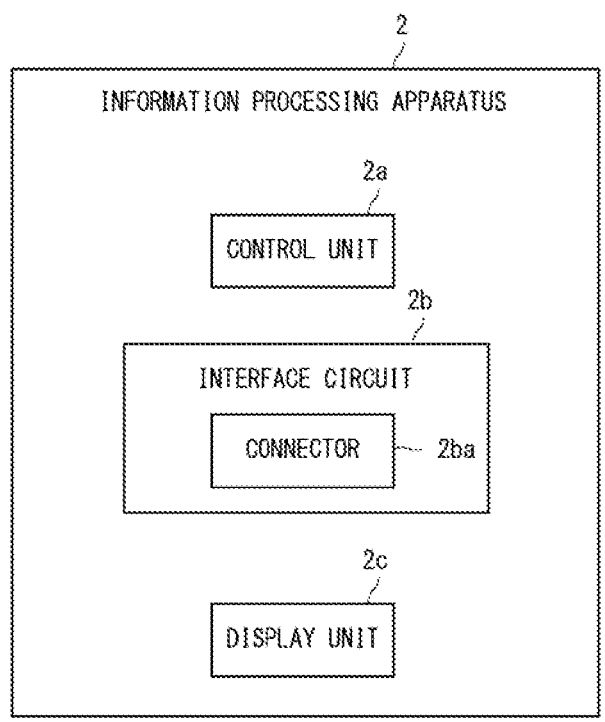
FIG. 2 is a diagram showing a configuration example of an information processing apparatus according to the first example embodiment.

The above-described interface circuit 1 can be embedded in an information processing apparatus as it is or can be configured so as to perform the display control on a main body of the information processing apparatus. Since the former configuration is simply to embed, the description thereof is omitted. The latter configuration is described with reference to FIG. 2 as an information processing apparatus according to the first example embodiment. FIG. 2 is a diagram showing a configuration example of an information processing apparatus according to the first example embodiment.

As shown in FIG. 2, an information processing apparatus 2 according to this example embodiment includes a control unit 2a, an interface circuit 2b, and a display unit 2c. The interface circuit 2b includes a connector 2ba for connecting to an electronic device and may be an interface circuit of any standard, as long as the connector 2ba that complies with the standard is provided. As the information processing apparatus 2, various devices such as a Personal Computer (PC) and a mobile phone (including ones called smartphones) and the like can be applied.

The control unit 2a displays an operation mode supported by the interface circuit 2b and a supported power supply mode on the display unit 2c when the electronic device is not connected to the connector 2ba. The control unit 2a can determine whether or not the electronic device is connected to the connector 2ba, and according to the determination result, perform the display control described above.

As described above, the interface circuit 1 or the information processing apparatus 2 according to this example embodiment makes a user easily determine before connecting whether or not an electronic device is able to operate and whether or not power can be supplied when connected to the interface circuit 1 or 2b.

Second Example Embodiment

Figure 3:
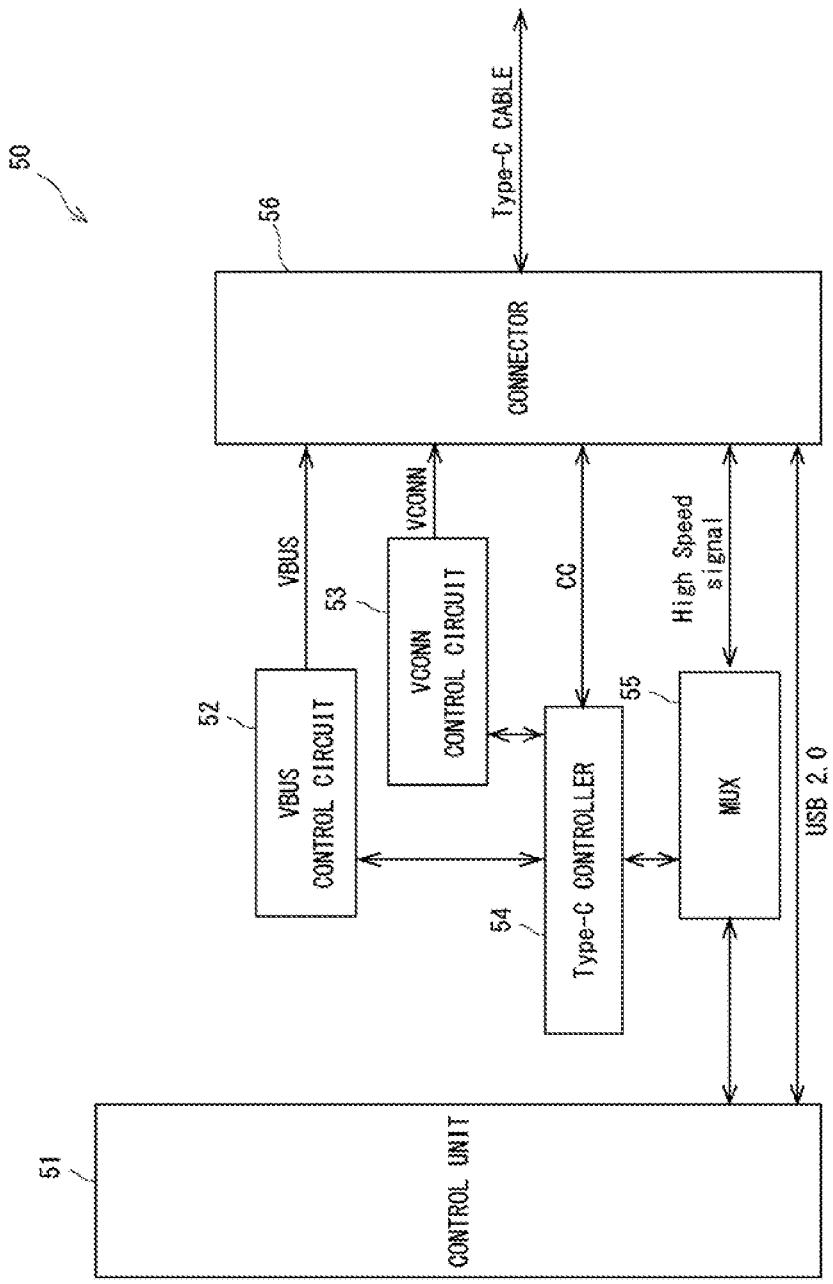
FIG. 3 is a diagram showing a configuration of an interface circuit according to a comparative example.

The second example embodiment will be described with reference to FIG. 3 to FIG. 8 mainly focusing on the differences from the first example embodiment, however, various examples described in the first example embodiment can be applied. Before describing the interface circuit according to this example embodiment, the interface circuit according to the comparative example is described with reference to FIG. 3. FIG. 3 is a diagram showing a configuration of an interface circuit according to a comparative example.

The interface circuit 50 shown in FIG. 3 is a standard Type-C interface circuit and includes a control unit 51, a VBUS control circuit 52, a VCONN control circuit 53, a Type-C controller 54, a multiplexer (MUX) 55, and a connector 56. Some or all of these components may be integrated and used in a single semiconductor element. A Type-C cable can be connected to the connector 56.

The control unit 51 includes a CPU, Input Output (IO) control unit and so on, and controls the entirety of the interface circuit 50. The connector 56 is a Type-C connector and includes a plurality of signal lines for passing the following signals. That is, the connector 56 can include signal lines for each of Configuration Channel (CC) signal for configuration communication, USB 2.0 signal, other high-speed signals, VBUS for power supply, and VCONN. The other high-speed signals mentioned above include USB 3.0, USB 3.1, I/O signal such as Peripheral Component Interconnect (PCI) Express and the like. The VCONN is a power supply to E-Marker used for the determination of whether or not the supplied power can be safely relayed. The E-Marker is an IC chip embedded in the Type-C cable connected to the connector 56.

The IO control unit includes a function that supplements the operation of the CPU and can be configured in a chipset. This chipset can embed a Host controller for each of the interfaces of the aforementioned high-speed signals that are USB 2.0, USB 3.0, USB 3.1, and an I/O signal such as PCI Express. Moreover, this chipset can embed a host controller for each of the interfaces of the Display Port, High-Definition Multimedia Interface (registered trademark) (HDMI) and the like that are interface signals for display. These host controllers may be configured by semiconductor elements other than the chipset.

The Type-C controller 54 controls all hardware related to Type-C. Specifically, the Type-C controller 54 negotiates with a counterpart electronic device using a Configuration Channel (CC) signal and acquires a power value requested by the electronic device. The Type-C controller 54 performs VBUS power supply control with a corresponding power profile. The Type-C controller 54 also establishes communication regarding the aforementioned high-speed signals and performs signal control with the flipped (reversed) Type-C cable.

The MUX 55 includes a function that receives an occurrence of a flip from the aforementioned Type-C controller 54 and swaps the high-speed signals between the Type-C connector 56 and the chipset. The VBUS control circuit 52 performs power control in compliance with the power profile according to the power supply control by the Type-C controller 54. The VCONN control circuit 53 supplies power to the E-Marker embedded in the Type-C cable.

The Type-C interface circuit 50 is one of the communication interface standards for information processing apparatuses and allows to relay a plurality of types of signals and power supply in a single cable. When connecting a video device with a touch panel, if a Type-C is used, multiple cables such as a USB cable for controlling the touch panel, a display cable for the video device, and a power cable for supplying power to these can be integrated into a single cable. Also, another feature is that the power supply specification (Type-C Power Delivery specification) is clearly defined. This allows for safe receiving and supplying power and dynamic change of power receiving and supplying direction, and therefore a Type-C interface circuit is becoming widely adopted as a power supply means for devices.

Figure 4:
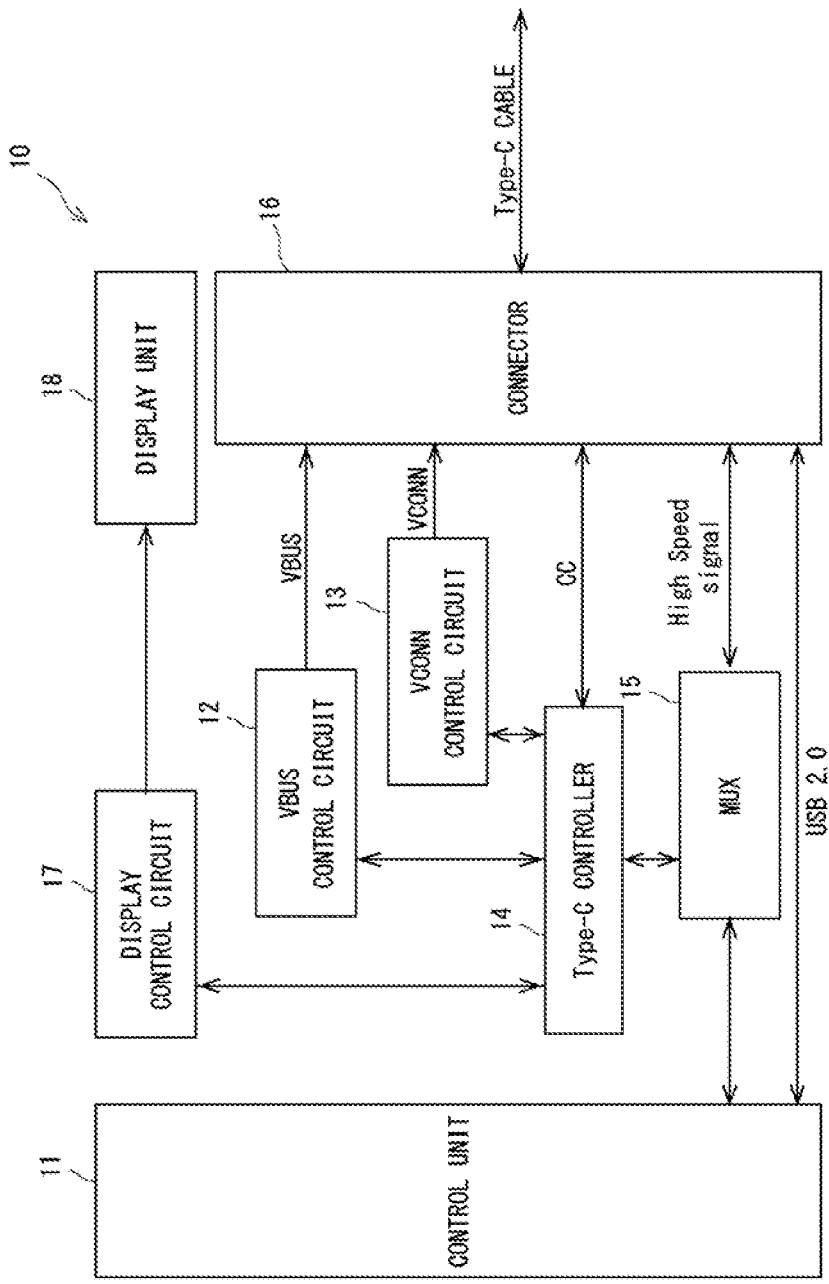
FIG. 4 is a diagram showing a configuration example of an interface circuit according to the second example embodiment.

Next, an interface circuit according to this example embodiment is described with reference to FIG. 4. FIG. 4 is a diagram showing a configuration example of an interface circuit according to the second example embodiment.

As shown in FIG. 4, the interface circuit 10 according to this example embodiment is a USB Type-C interface circuit and includes a control unit 11, a VBUS control circuit 12, a VCONN control circuit 13, a Type-C controller 14, a MUX 15, and a connector 16. These components correspond to the components having the same name as that of the standard Type-C interface circuit 50 in FIG. 3 as the basic configuration. One or all of these components may be integrated and used in a single semiconductor element. Also, as described above, the control unit 11 includes a CPU, an IO control unit and so on and controls the entirety of the interface circuit 10. The IO control unit can also be configured in a chipset, as described above. A Type-C cable can be connected to the connector 16.

The interface circuit 10 according to this example embodiment includes a display unit control circuit (display control circuit) 17 and a display unit 18, that correspond to the display unit 1c. The display unit 18 can be configured with a Light Emitting Diode (LED), a 7-segment LED, a Liquid Crystal Display (LCD) and the like. The display control circuit 17 is a circuit for controlling the display unit 18.

The Type-C controller 14 in the interface circuit 10 differs from the Type-C controller 54 in that including a function that corresponds to the control unit 1a in the first example embodiment. Specifically, the Type-C controller 14 controls the display control circuit 17 so that the display unit 18 displays an operation mode supported by the interface circuit 10 and a supported power supply mode with an electronic device not connected to the connector 16. On the display unit 18, an operation mode and a power supply mode of Type-C that are supported by the interface circuit 10 are displayed before the electronic device is connected. Here, the electronic device (hereinafter simply referred to as a device) may correspond to an external device or an attached device that is attached to the interface circuit 10.

An operation mode of Type-C can be preliminarily stored in the display control circuit 17, and when it is stored, the display control circuit 17 may not be connected to the Type-C controller 14. When the Type-C controller 14 can directly control the display unit 18, the display control circuit 17 may not be provided.

The Type-C controller 14 of this example embodiment displays an established operation mode and an established power supply mode (i.e., power supply status) on the display unit 18 via the display control circuit 17 after negotiation with the device connected to the connector 16 via a cable. In this example, an established operation mode of Type-C is displayed as the established operation mode on the display unit 18, and status of the VBUS that is set by Power Delivery (PD) as the power supply status is displayed on the display unit 18.

Here, the type-C controller 14 can control to change the display after negotiation. Alternatively, the type-C controller 14 can control so as to display the established operation mode and the power supply mode along with the display content before connection.

Next, an operation (processing flow) of the interface circuit 10 is described. The display control circuit 17 is connected to the Type-C controller 14 and controls the display unit 18. The Type-C controller 14 sends data about the supported operation mode and the power supply mode (power supply specification) to the display control circuit 17 before the device is connected. The display control circuit 17 displays them on the display unit 18.

After connecting the device, the Type-C controller 14 displays the operation mode established by CC communication and the VBUS status set by PD similarly on the display unit 18 via the display control circuit 17.

Here, the following points can be displayed about the operation mode.

Information showing whether or not an Alternate mode that communicates using another high-speed signal than a USB signal is supported and when supported, what the high-speed signal is are displayed. High-speed signals include USB 3.0, USB 3.1, PCI Express Display Port, HDMI (registered trademark) and the like, and the communication is performed using a High Speed Signal data line.

One of the following (1) to (3) can be displayed as the power supply specification. A power supply direction can also be displayed. In other words, if the mode in which the power is supplied from the host side is supported, if the mode in which the power is supplied from the device side is supported, if both modes in which the power is supplied from the host side and the device side are supported (both modes are supported), can also be displayed.

(1) USB Type-C Current @ 1.5 A (Nominal Voltage: 5 V, Maximum Current: 1.5 A)
(2) USB Type-C Current @ 3.0 A (Nominal Voltage: 5 V, Maximum Current: 3.0 A)
(3) USB PD (Nominal Voltage: can be set up to 20 V, Maximum Current: can be set up to 5 A)

The maximum voltage and current that are output to VBUS after negotiation can be displayed as the VBUS status.

When the device side sends power profile information that is not supported via CC communication, the Type-C controller 14 may similarly display the content of the profile on the display unit 18 via the display control circuit 17. The Type-C controller 14 may display the power profile information on the display unit 18 when unsupported power profile information is received after negotiation with the device connected to the connector 16 via a cable.

When a cable with an embedded E-Marker is used, the CC communication is also performed to the chip incorporated in the cable. In this case, the Type-C controller 14 may similarly display the content (the information acquired through CC communication) on the display unit 18. The content is the power profile information (maximum voltage and maximum current) of the cable.

Figure 5:
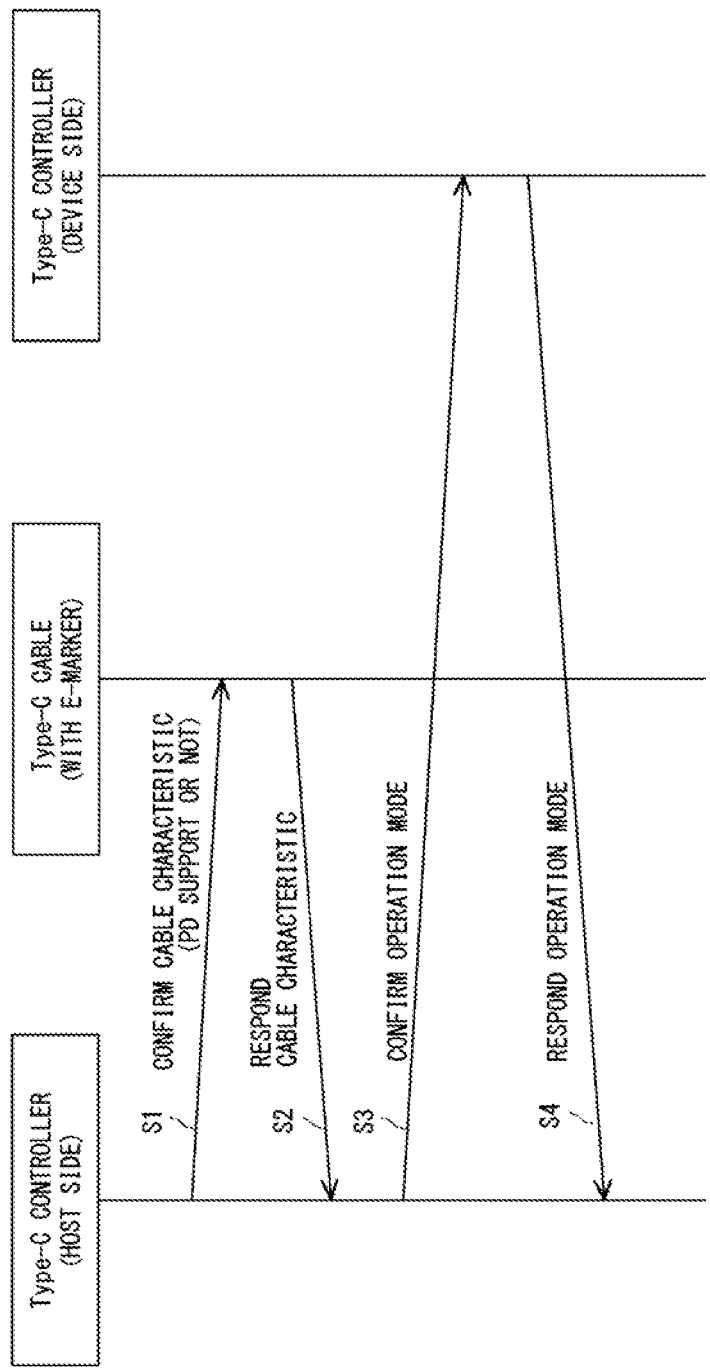
FIG. 5 is a flow chart for describing an example of a process in the interface circuit of FIG. 4.

Next, with reference to FIG. 5, a sequence example until communication is established between the interface circuit 10 of Type-C and the device. FIG. 5 is a flow chart for describing an example of a process (communication establishment process) in the interface circuit 10 of FIG. 4.

Firstly, a device is connected to the interface circuit 10 via a Type-C cable with an embedded E-Marker. When this connection is performed, the Type-C controller 14 of the interface circuit 10 confirms the cable characteristic (with or without PD support) to the E-Marker of the Type-C cable (step S1). The Type-C controller 14 obtains the answer (response) (step S2). The Type-C controller 14 establishes communication by confirming the operation mode to the Type-C controller of the device (step S3) and obtaining the answer (step S4). The communication between the interface circuit 10 and the device is established as described above.

Figure 6:
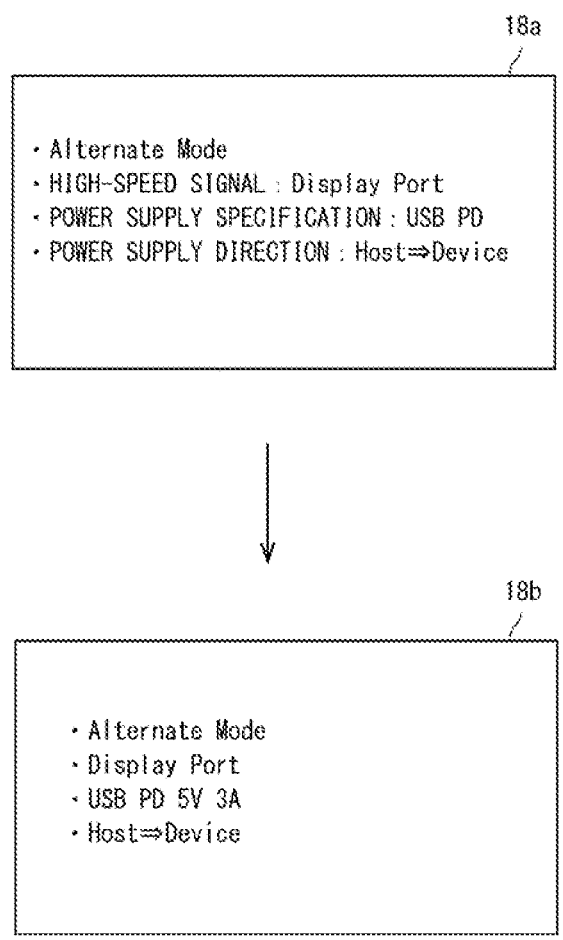
FIG. 6 is a diagram showing a display example of the interface circuit in FIG. 4.
Figure 7:
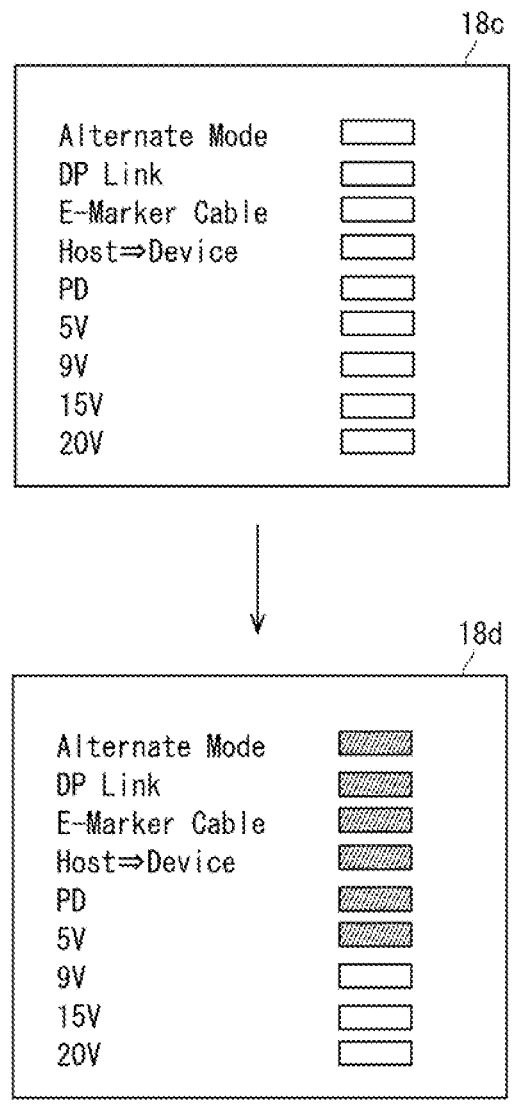
FIG. 7 is a diagram showing another display example of the interface circuit in FIG. 4.

Next, with reference to FIG. 6 to FIG. 7, the display example is described.

FIG. 6 is a diagram showing a display example of the interface circuit 10. The display image 18a shown in FIG. 6 is an example of an image displayed on the display unit 18 before a device is connected. The display image 18a shows that the Display Port signal is supported in the Alternate mode, the power supply specification is USB PD, and the power supply direction is from the host (HOST) to the device (Device).

The display image 18b shown in FIG. 6 is an example of an image displayed on the display unit 18 when the device is connected and the negotiation is completed afterwards. The display image 18b shows that the Display Port communication is established in the Alternate Mode, and 5V (3A at maximum) is supplied in USB PD.

The display image 18a may disappear when the display image 18b is displayed, or the display image 18b may be displayed in addition to the display of the display image 18a.

FIG. 7 is a diagram showing another display example of the interface circuit of FIG. 4. The display image 18c shown in FIG. 7 is another example of an image displayed on the display unit 18 before a device is connected. The display image 18c shows that the Display Port signal is supported in the Alternate mode, power supply specification is USB PD (supporting 5, 9, 15, and 20 V), and the power supply direction is from the HOST to the Device.

The display image 18d shown in FIG. 7 is another example of an image displayed on the display unit 18 when the device is connected and the negotiation is completed afterwards. The display image 18d shows that the Display Port communication is established in the Alternate Mode, and 5V is supplied by USB PD via an E-Marker cable. In the example in FIG. 7, before the device is connected, the display image 18c is displayed, and when the device is connected and the negotiation is completed, the display image 18d is displayed.

In the above description, about the display on the display unit 18, the Type-C controller 14 determines based on the result of the CC communication, and displays by sending data to the display control circuit 17. Here, CC communication may be captured using a circuit other than the Type-C controller 14, and the circuit other than the Type-C controller 14 may display by sending the data to the display control circuit 17. Alternatively, the display control circuit 17 may not be provided, and the circuit other than the Type-C controller 14 may display by controlling the display unit 18.

Figure 8:
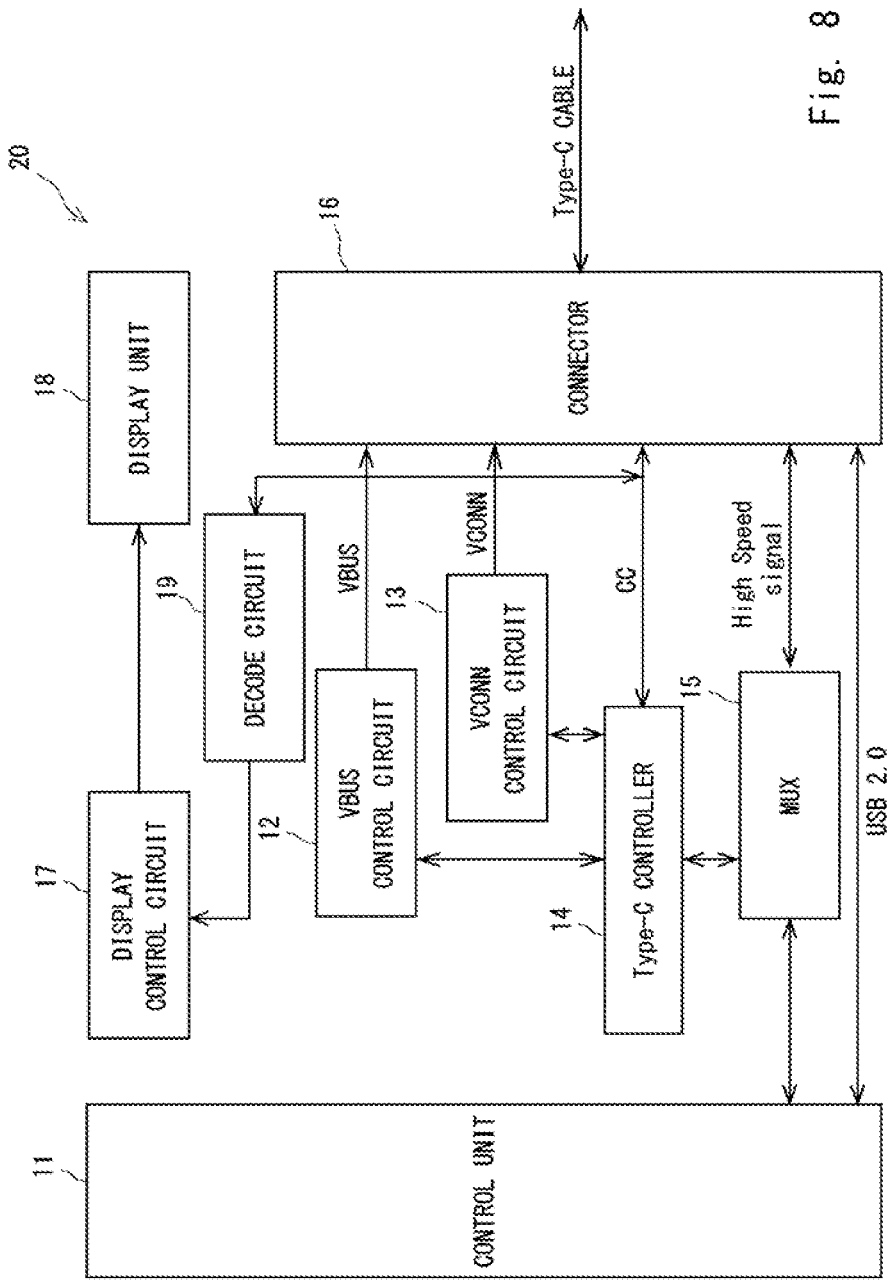
FIG. 8 is a diagram showing another configuration example of an interface circuit according to the second example embodiment.

Next, another configuration example of an interface circuit according to this example embodiment is described with reference to FIG. 8. FIG. 8 is a diagram showing the other configuration example mentioned above. The interface circuit 20 shown in FIG. 8 is the interface circuit 10 shown in FIG. 4 including a decode circuit 19.

The decode circuit 19 decodes the CC communication, sends the data to the display control circuit 17, and displays the established operation mode and the VBUS status set by PD on the display unit 18. In this case, the display control circuit 17 preliminarily stores an operation mode and a power supply specification of Type-C supported by the interface circuit 20, and displays the supported operation mode and the supported power supply specification of Type-C on the display unit 18 before the device is connected.

In the above example, the control unit 11 is assumed to be a dedicated control unit of the interface circuit 10 or 20, but it may be a control unit of an information processing apparatus including a Type-C interface circuit. In a case the control unit 11 is a dedicated control unit of the interface circuit 10 or 20, when the interface circuit 10 or 20 is incorporated in an information processing apparatus, the control unit 11 is connected to the control unit of the information processing apparatus.

The display unit 18 is assumed to be a dedicated display unit for the interface circuit 10 or 20. However, the display unit 18 may be a display unit of an information processing apparatus including a similar (but no display unit) interface circuit or a part of such a display unit.

Next, the effect of this example embodiment will be described. Various devices can be connected to the Type-C interface circuit 50 according to the comparative example, on the other hand, the standard only defines the minimum signals to be connected and the minimum power to be supplied. In other words, in the interface circuit 50, it is up to the manufacturer of the control unit and peripherals how and what to expand other specifications. For example, the Type-C connector 56 includes a dedicated terminal for wiring USB 2.0 and a terminal for wiring high-speed signals such as USB 3.1 and Display Port, however, wiring both is not necessary, and is not defined as mandatory by the standard. In the PD specification, several power profiles are defined, however, actually supporting all power profiles is not mandatory. As described above, currently the specifications are determined freely by system manufacturers.

On the other hand, since the connector and the cable shapes are standardized by a uniform specification, a physical connection is possible even when the electrical specification is different between the control unit and the peripheral. Therefore, a user in the market does not have a way to determine if both Type-C devices are connectible to each other and usable. As a result, on the interface circuit 50, there is a case that the devices do not operate correctly due to the difference in the specification, and this may cause confusion in the market.

In response to this, in the above-described example embodiment, the Type-C controller 14 drives the display control circuit 17 and controls to display a supported operation mode and a current power supply status. Here, operation status and the like other than the power supply status may be displayed. In this example embodiment, the display control circuit 17 displays the operation mode, power supply status and the like on the display unit 18 in an externally visible form.

Therefore, according to this example embodiment, since an operation mode supported by the hardware of the interface circuit 10 or 20 is visualized so that a user can see, the user can easily determine the matching of the specifications on the host side and the device side before connecting. In particular, it is difficult to determine a mode such as an operation mode supported on the host side until the device to connect is connected if the display unit is on the cable. On the other hand, in this example embodiment, since it is possible to determine (identify) the mode such as the operation mode supported on the host side (control unit side), whether or not a device is supported can be determined before connecting it, and the information can be notified as it is. Moreover, in this example embodiment, visualizing the currently supplied power, direction, communication status, cable abnormality and the like allows the user to easily confirm these as well.

As described above, this example embodiment achieves the effects described below.

The first effect is that, by visualizing an operation mode of Type-C supported by the Type-C interface circuit before connection, a user can easily determine whether or not specifications on the host side and the device side match.

The second effect is that, by visualizing the current operation mode, a user can easily visually see the current power supply, power supply direction, communication status and the like.

Third Example Embodiment

Figure 9:
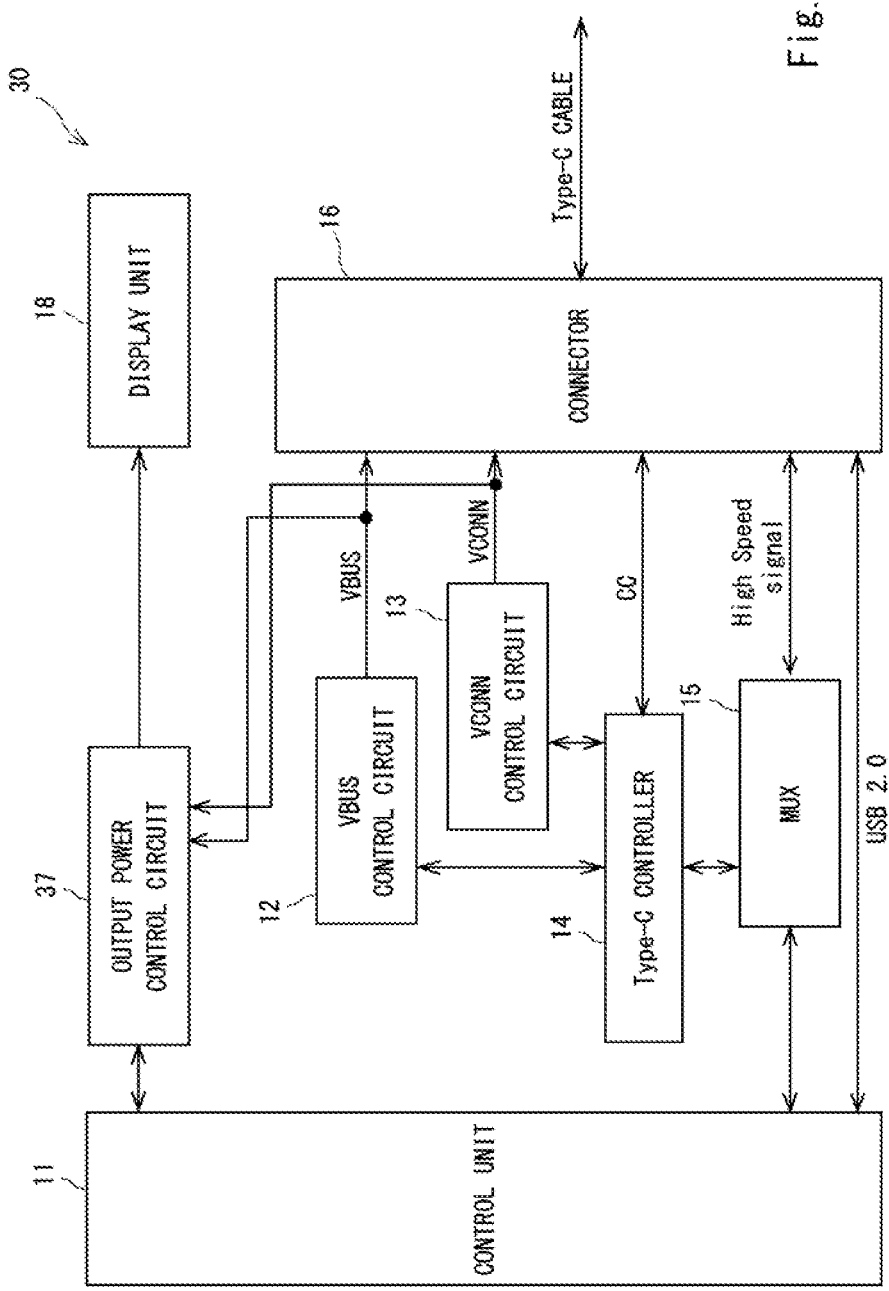
FIG. 9 is a diagram showing a configuration example of an information processing apparatus according to the third example embodiment.

The third example embodiment will be described with reference to FIG. 9 and FIG. 10 mainly focusing on the differences from the second example embodiment, however, various examples described in the first example embodiment and the second example embodiment can be applied. FIG. 9 is a diagram showing a configuration example of an information processing apparatus including an interface circuit according to the third example embodiment.

As shown in FIG. 9, the information processing apparatus 30 according to this example embodiment includes an output power monitoring circuit 37 instead of the display control circuit 17 in the interface circuit 10 shown in FIG. 4, and the control unit 11 and the display unit 18 are components of the information processing apparatus 30. The output power monitoring circuit 37 is connected to the VBUS control circuit 12 and the VCONN control circuit 13. The output power monitoring circuit 37 is connected to the control unit 11 and can be controlled by the control unit 11. As described above, the control unit 11 of FIG. 9 is a control unit of an information processing apparatus including a Type-C interface circuit, and the display unit 18 is a display unit or a part of a display unit of an information processing apparatus including a Type-C interface circuit.

In this example embodiment, the output power monitoring circuit 37 obtains an actual VBUS status that is output after connecting a device via the output power monitoring circuit 37, and the output power monitoring circuit 37 displays the result on the display unit 18. This allows a user to visually see the current VBUS status, and to know about power supply abnormality and the like.

Figure 10:
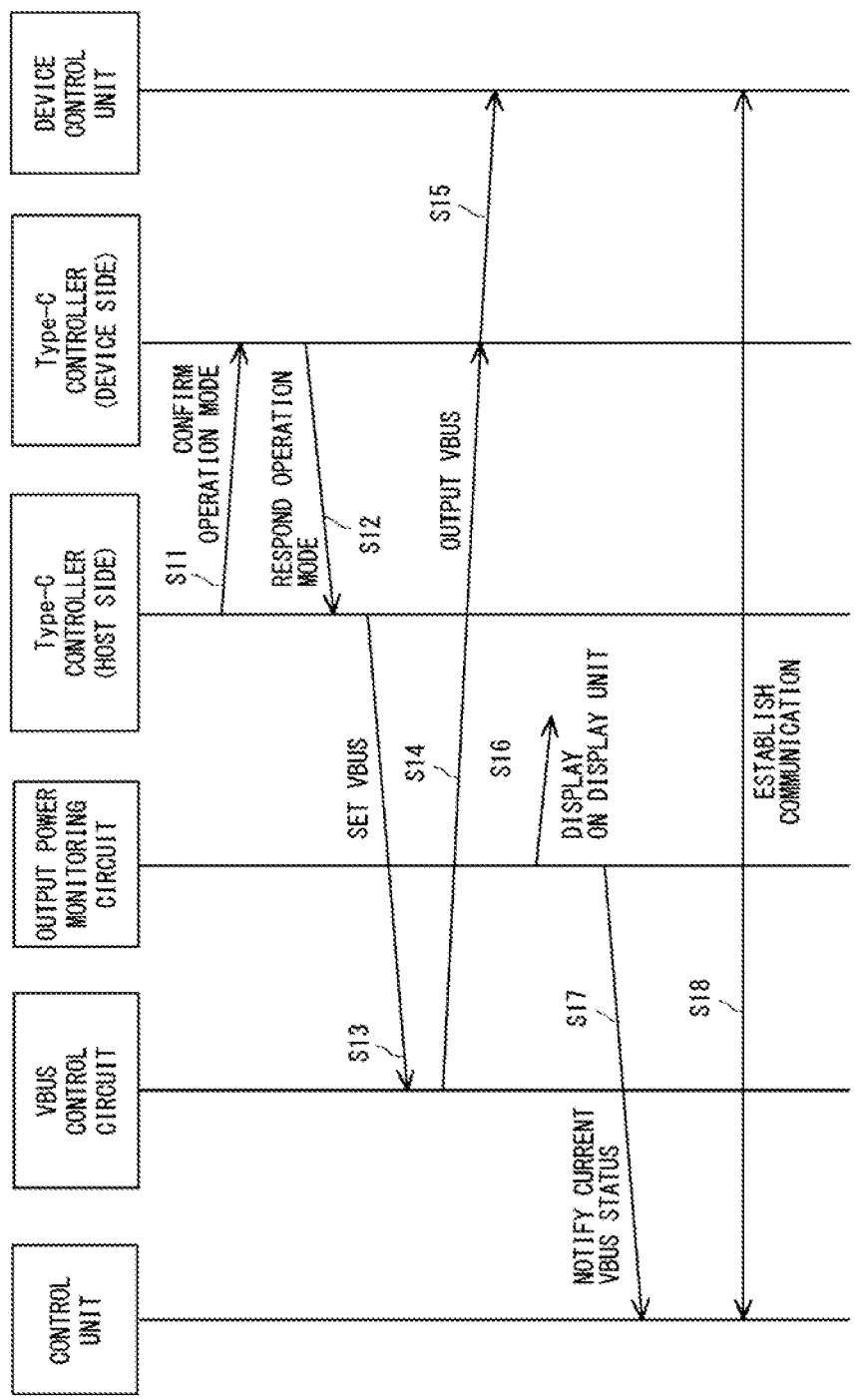
FIG. 10 is a flow chart for describing an example of a process in the information processing apparatus of FIG. 9.

Next, with reference to FIG. 10, a sequence example until communication is established between the information processing apparatus 30 and the device via a Type-C cable connected to a Type-C interface circuit is described. FIG. 10 is a flow chart for describing an example of a process (communication establishment process) in the information processing apparatus 30 of FIG. 9.

Firstly, a device is connected to the connector 16 via a Type-C cable. When the connection is performed, the Type-C controller 14 confirms the operation mode to the Type-C controller of the device (step S11) and obtains the answer (step S12), similarly to the steps S3 and S4 in FIG. 5. The Type-C controller 14 performs VBUS setting to the VBUS control circuit 12 based on the answer (step S13). Then, the VBUS control circuit 12 supplies power by outputting VBUS to the Type-C controller on the device side (step S14), and the Type-C controller on the device side supplies power to the control unit of the device (step S15).

The output power monitoring circuit 37 displays the current VBUS status on the display unit 18 after the VBUS is set (step S16), and notifies the current VBUS status to the control unit 11 (step S17). The order of steps S16 and S17 is not critical. Then, the communication between the control unit 11 of the information processing apparatus 30 and the control unit of the device is established (step S18). The display unit 18 displays the established operation mode and the VBUS status that is set after the device is connected and the negotiation is performed.

The storage unit of the information processing apparatus 30 (not in the diagram) preliminarily stores an operation mode and a power supply specification of Type-C supported by the Type-C interface circuit. The control unit 11 of the information processing apparatus 30 displays a supported operation mode and a supported power supply specification of Type-C on the display unit 18 via the output power monitoring circuit 37.

In this way, in this example embodiment, a similar effect as that of the second example embodiment can be obtained with a configuration different from that of the second example embodiment.

Fourth Example Embodiment

Figure 11:
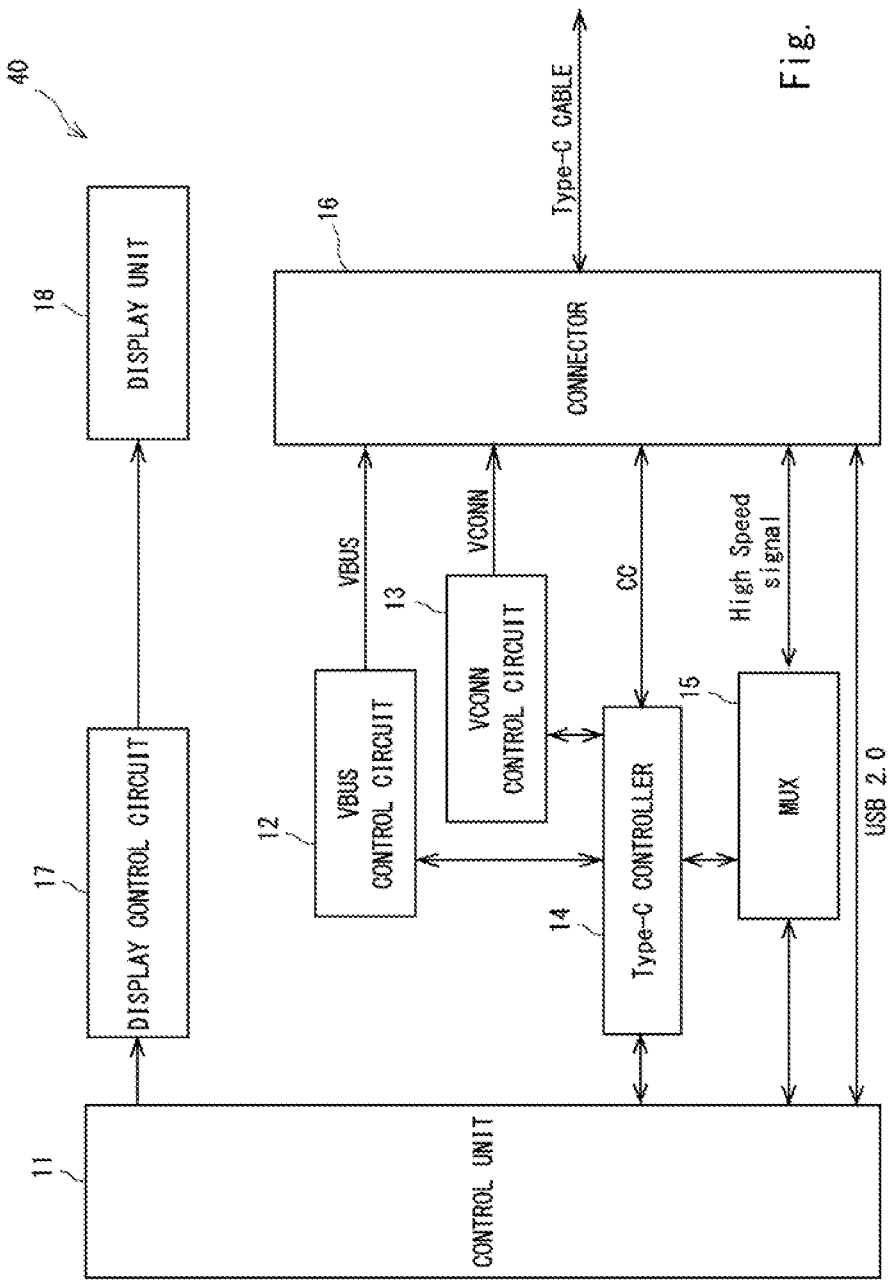
FIG. 11 is a diagram showing a configuration example of an information processing apparatus according to the fourth example embodiment.

The fourth example embodiment will be described with reference to FIG. 11 to FIG. 12 mainly focusing on the differences from the second example embodiment, however, various examples described from the first example embodiment to the third example embodiment can be applied. FIG. 11 is a diagram showing a configuration example of an information processing apparatus including an interface circuit according to the fourth example embodiment.

As shown in FIG. 11, the information processing apparatus 40 according to this example embodiment includes a display control circuit 17 connected to a Type-C controller 14 not directly but via a control unit 11 in the interface circuit 10 shown in FIG. 4. The information processing apparatus 40 includes the control unit 11 and the display unit 18 as the components of the information processing apparatus 40. In other words, the control unit 11 of FIG. 11 is a control unit of an information processing apparatus 40 including a Type-C interface circuit, and the display unit 18 is a display unit or a part of a display unit of the information processing apparatus 40 including a Type-C interface circuit.

In this example embodiment, a supported operation mode and a supported power supply specification are notified from the Type-C controller 14 to the control unit 11 before a device is connected. The control unit 11 displays the supported operation mode and the supported power supply specification on the display unit 18 via the display control circuit 17.

After connecting the device, the information obtained by the CC communication of Type-C is notified from the Type-C controller 14 to the control unit 11. The control unit 11 displays the operation mode established by the CC communication and the VBUS status set by PD on the display unit 18 via the display control circuit 17.

Figure 12:
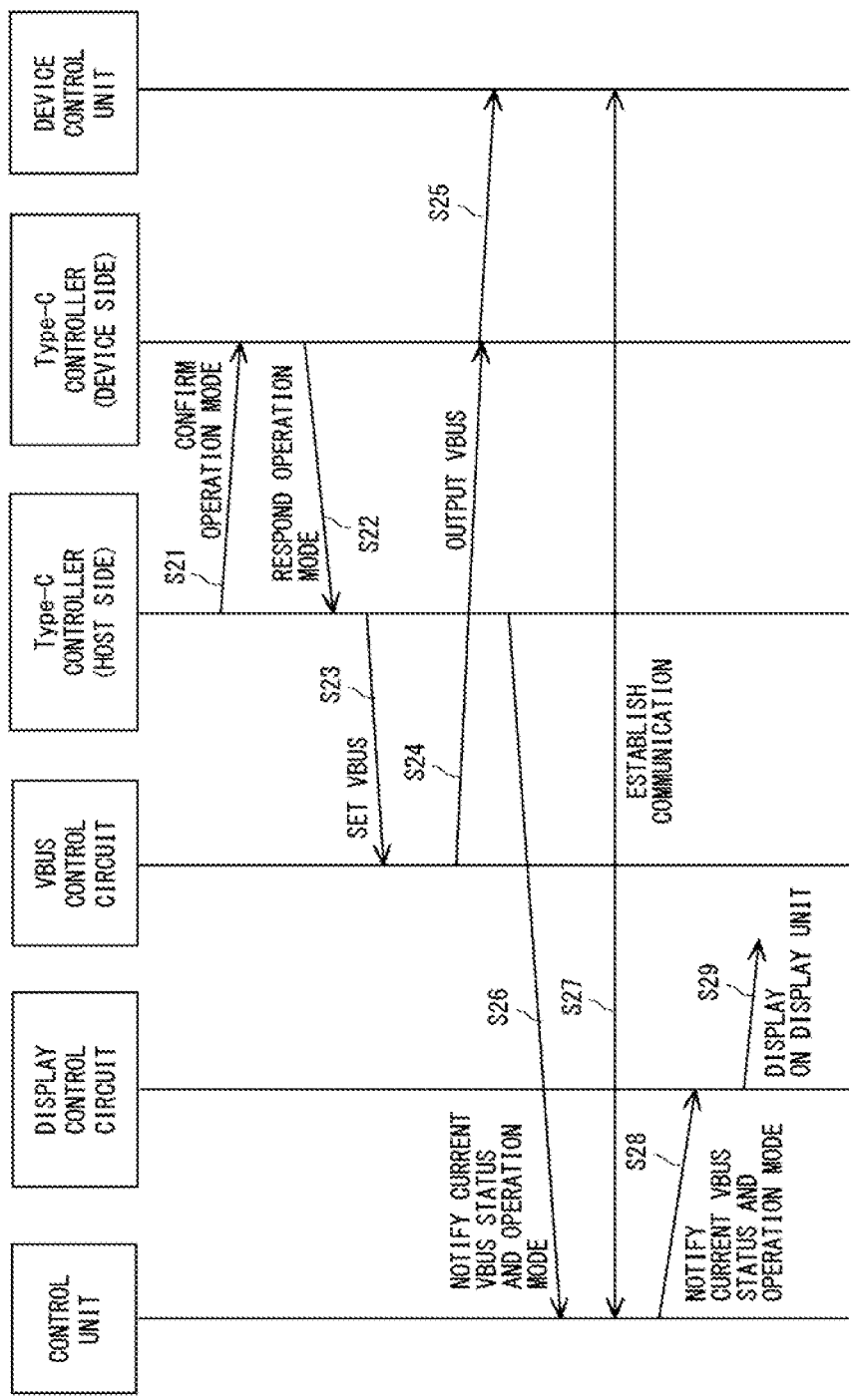
FIG. 12 is a flow chart for describing an example of a process in the information processing apparatus of FIG. 11.

Next, with reference to FIG. 12, a sequence example until communication is established between the information processing apparatus 40 and a device via a Type-C cable connected to a Type-C interface circuit is described. FIG. 12 is a flow chart for describing an example of a process (communication establishment process) in the information processing apparatus 40 of FIG. 11.

Firstly, a device is connected to the connector 16 via a Type-C cable. When this connection is performed, the Type-C controller 14 confirms the operation mode to the Type-C controller of the device (step S21) and obtains the answer (step S22), similarly to the steps S3 and S4 in FIG. 5. The Type-C controller 14 performs VBUS setting to the VBUS control circuit 12 based on the answer (step S23). Then, the VBUS control circuit 12 supplies power by outputting VBUS to the Type-C controller on the device side (step S24), and the Type-C controller on the device side supplies power to the control unit of the device (step S25). The flow up to the present point is similar to steps S11 to S15 in FIG. 10.

The Type-C controller 14 notifies the current VBUS status to the control unit 11 after the VBUS is set and power is supplied (step S26). Then, the communication between the control unit 11 of the information processing apparatus 40 and the control unit of the device is established (step S27). Afterwards, the control unit 11 notifies the current VBUS status and the operation mode to the display control circuit 17 (step S28), and the display control circuit 17 displays the content of the notification on the display unit 18 (step S29). The Type-C controller 14 may display the power profile information on the display unit 18 when unsupported power profile information is received after negotiation in this example embodiment, too.

The storage unit of the information processing apparatus 40 (not in the diagram) preliminarily stores an operation mode and a power supply specification of Type-C supported by the Type-C interface circuit. The control unit 11 of the information processing apparatus 40 displays a supported operation mode and a supported power supply specification of Type-C on the display unit 18 via the display control circuit 17 before the device is connected.

In this way, in this example embodiment, a similar effect as that of the second example embodiment can be obtained with a configuration different from that of the second example embodiment.

Other Example Embodiments

[a]

In the first example embodiment, the functions of each unit of the interface circuit 1 and the information processing apparatus 2 are described, however, it is sufficient when the functions are realized as the interface circuit 1 and the information processing apparatus 2, respectively. Each of the components described in the second example embodiment to the fourth example embodiment is merely an example, and other communication standards may be explained in the same manner. In the first example embodiment to the fourth example embodiment, the interface circuit can include a plurality of connectors (same type or different type), and in that case, it is sufficient when configured so that a display control is performed for a display unit on each connector.

[b]

Figure 13:
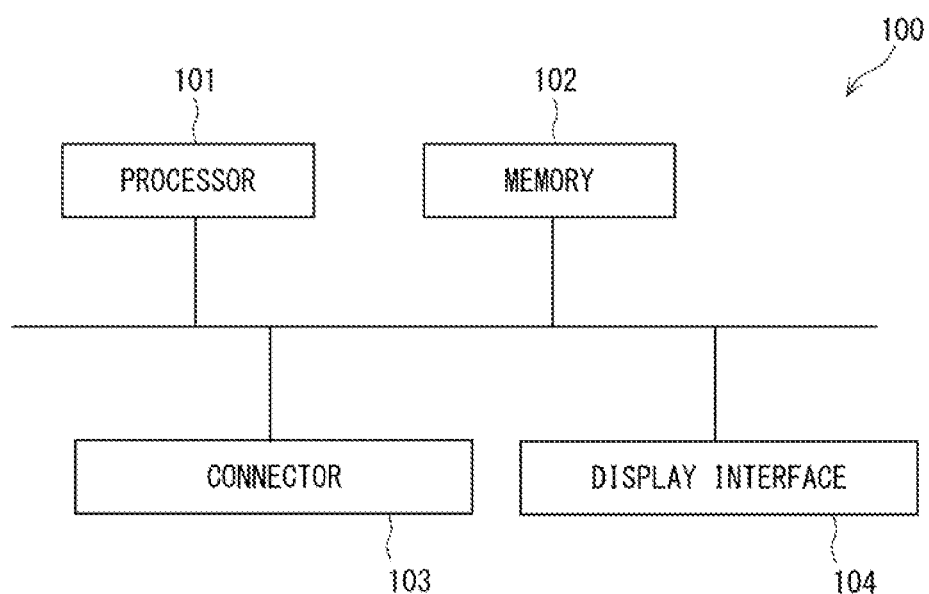
FIG. 13 is a diagram showing a hardware configuration example of an interface circuit or an information processing apparatus.

The interface circuit or the information processing apparatus according to the first example embodiment to the fourth example embodiment may include the following hardware configuration. FIG. 13 is a diagram showing a hardware configuration example of the interface circuit or the information processing apparatus according to the first example embodiment to the fourth example embodiment. The same applies to the other example embodiment [a] described above.

The apparatus 100 (an interface circuit or an information processing apparatus) shown in FIG. 13 includes a processor 101, a memory 102, a connector 103, and a display interface 104. The display interface 104 is connected to a display unit. The functions of other units such as the control units 1a, 2a and the like described in the first example embodiment are realized by the processor 101 reading a program stored in the memory 102 and executing in cooperation with the connector 103 and the display interface 104.

In the above example, the program is stored using a non-transitory computer-readable medium of various types and can be supplied to a computer. The non-transitory computer-readable medium includes a tangible storage medium of various types. Examples of non-transitory computer-readable media include magnetic record media (a flexible disk, magnetic tape, hard disk drive, for example) and magneto-optical record media (a magnetooptical disk, for example). This example includes CD-ROM (Read Only Memory), CD-R, and CD-R/W. This example further includes a semiconductor memory (mask ROM, Programmable ROM (PROM), Erasable PROM (EPROM), flash ROM, and Random Access Memory (RAM), for example). The program may be provided to a computer by a transitory computer-readable medium of various types. Examples of transitory computer-readable media include an electric signal, an optic signal, and an electromagnetic wave. Transitory computer-readable medium can provide a program to a computer via a wired communication path such as an electric wire and an optical fiber or a wireless communication path.

[c]

As the procedures of the display method on an interface circuit or an information processing apparatus have been exemplified in the various example embodiments described above, the present disclosure may be in a form of a display method (display method of status of an interface circuit). The display method includes a detection step and a display step described below. The detection step detects that an electronic device is not connected to a connector for connecting the electronic device. The display step displays an operation mode and a power supply mode supported by an interface circuit including the connector on a display unit when the detection step detects that the electronic device is not connected to the connector. Other examples are as described in the various example embodiments described above. The above program can be said to be a program for a control computer embedded in or connected to an interface circuit including a connector for connecting to an electronic device to execute the above-described detection step and the above-described display step. Here, the control computer embedded in the interface circuit has an embedded or connected display unit. The control computer connected to the interface circuit is a computer such as a general-purpose PC and has an embedded or connected display unit.

The present disclosure is not limited to the above-mentioned example embodiments and may be modified as necessary without departing from the purpose. The present disclosure may be implemented by appropriately combining each example embodiment.

The whole or part of the exemplary embodiments disclosed above can be described as, but not limited to, the following supplementary notes.

Supplementary Note

Supplementary Note 1

An interface circuit comprising:
a connector configured to connect to an electronic device;
display unit; and
control unit, wherein
the control unit displays a supported operation mode and a supported power supply mode on the display unit when the electronic device is not connected to the connector.

Supplementary Note 2

The interface circuit according to Supplementary Note 1, wherein the control unit displays an established operation mode and an established power supply mode on the display unit after negotiation with the electronic device connected to the connector via a cable.

Supplementary Note 3

The interface circuit according to Supplementary Note 1 or 2, wherein the control unit displays power profile information on the display unit when the unsupported power profile information is received after negotiation with the electronic device connected to the connector via a cable.

Supplementary Note 4

The interface circuit according to any one of Supplementary Notes 1 to 3, wherein the interface circuit is a Universal Serial Bus universal serial bus (USB) Type-C interface circuit.

Supplementary Note 5

The interface circuit according to Supplementary Note 2 or 3, wherein the interface circuit is a Universal Serial Bus (USB) Type-C interface circuit,
the cable includes an embedded E-Marker, and
the control unit displays information acquired through configuration channel (CC) communication with the E-Marker, on the display unit.

Supplementary Note 6

An information processing apparatus comprising:
an interface circuit configured to include a connector for connecting to an electronic device;
display unit; and
control unit, wherein
the control unit displays an operation mode and a power supply mode being supported by the interface circuit on the display unit when the electronic device is not connected to the connector.

Supplementary Note 7

The information processing apparatus according to Supplementary Note 6, wherein the control unit displays an established operation mode and an established power supply mode on the display unit after negotiation with the electronic device connected to the connector via a cable.

Supplementary Note 8

The information processing apparatus according to Supplementary Note 6 or 7, wherein the control unit displays power profile information on the display unit when the unsupported power profile information is received after negotiation with the electronic device connected to the connector via a cable.

Supplementary Note 9

The information processing apparatus according to any one of Supplementary Notes 6 to 8, wherein the interface circuit is a Universal Serial Bus (USB) Type-C interface circuit.

Supplementary Note 10

The information processing apparatus according to Supplementary Note 7 or 8, wherein the interface circuit is a Universal Serial Bus universal serial bus (USB) Type-C interface circuit,
the cable includes an embedded E-Marker, and
the control unit displays information acquired through configuration channel (CC) communication with the E-Marker, on the display unit.

Supplementary Note 11

A display method comprising:
a detection step of detecting that an electronic device is not connected to a connector for connecting to the electronic device; and
a display step of displaying an operation mode and a power supply mode being supported by an interface circuit including the connector, on display unit, when the detection step detects that the electronic device is not connected to the connector.

Supplementary Note 12

A program for causing a control computer embedded in or connected to an interface circuit including a connector for connecting to an electronic device, to execute:
a detection step of detecting that the electronic device is not connected to the connector; and
a display step of displaying an operation mode and a power supply mode being supported by the interface circuit when the detection step detects that the electronic device is not connected to the connector.

The present invention has been described with reference to the example embodiments, however, the present invention is not limited by the above description. Various modifications that may be understood by a person skilled in the art may be made to a configuration and a detail of the present invention within the scope of the invention.

This application claims priority based on Japanese Patent Application No. 2019-007701 filed on Jan. 21, 2019, all of which are incorporated herein by reference.

REFERENCE SIGNS LIST 1, 2b INTERFACE CIRCUIT
1a, 2a CONTROL UNIT
1b, 2ba, 16 CONNECTOR
1c, 2c DISPLAY UNIT
2, 30, 40 INFORMATION PROCESSING APPARATUS
10, 20 USB TYPE-C INTERFACE CIRCUIT
11 CONTROL UNIT
12 VBUS CONTROL CIRCUIT
13 VCONN CONTROL CIRCUIT
14 TYPE-C CONTROLLER
15 MUX
17 DISPLAY CONTROL CIRCUIT
18 DISPLAY UNIT
18a, 18b, 18c, 18d DISPLAY IMAGE
19 DECODE CIRCUIT
37 OUTPUT POWER MONITORING CIRCUIT
100 APPARATUS (INTERFACE CIRCUIT OR INFORMATION PROCESSING APPARATUS)
101 PROCESSOR
102 MEMORY
103 CONNECTOR
104 DISPLAY INTERFACE

What is claimed is:

1. An interface circuit comprising:
a connector configured to connect to an electronic device via a cable;
a display; and
a controller, wherein
the controller displays a supported operation mode and a supported power supply mode on the display when the electronic device is not connected to the connector via the cable, and displays an established operation mode and an established power supply mode on the display after negotiation with the electronic device connected to the connector via the cable along with the supported operation mode and the supported power supply mode before negotiation.

2. The interface circuit according to claim 1, wherein the controller displays power profile information on the display when unsupported power profile information is received after negotiation with the electronic device connected to the connector via the cable.

3. The interface circuit according to claim 1, wherein the interface circuit is a Universal Serial Bus (USB) Type-C interface circuit.

4. The interface circuit according to claim 1, wherein
the interface circuit is a Universal Serial Bus (USB) Type-C interface circuit,
the cable includes an embedded E-Marker, and
the controller displays information acquired through configuration channel (CC) communication with the E-Marker, on the display.

5. An information processing apparatus comprising:
an interface circuit configured to include a connector for connecting to an electronic device via a cable;
a display; and
a controller, wherein
the controller displays an operation mode and a power supply mode being supported by the interface circuit on the display when the electronic device is not connected to the connector via the cable, and displays an established operation mode and an established power supply mode on the display after negotiation with the electronic device connected to the connector via the cable along with the operation mode and the power supply mode being supported by the interface circuit before negotiation.

6. The information processing apparatus according to claim 5, wherein the controller displays power profile information on the display when unsupported power profile information is received after negotiation with the electronic device connected to the connector via the cable.

7. The information processing apparatus according to claim 5, wherein the interface circuit is a Universal Serial Bus (USB) Type-C interface circuit.

8. The information processing apparatus according to claim 5, wherein
the interface circuit is a Universal Serial Bus (USB) Type-C interface circuit,
the cable includes an embedded E-Marker, and
the controller displays information acquired through configuration channel (CC) communication with the E-Marker, on the display.

9. A display method comprising:
detecting that an electronic device is not connected to a connector for connecting to the electronic device via a cable by an interface circuit including the connector or an information processing apparatus including the interface circuit; and
causing the interface circuit or the information processing apparatus to display, on a display, an operation mode and a power supply mode being supported by the interface circuit, when the detecting detects that the electronic device is not connected to the connector via the cable, and to display, on the display, an established operation mode and an established power supply mode after negotiation with the electronic device connected to the connector via the cable along with the operation mode and the power supply mode being supported by the interface circuit before negotiation.

10. A non-transitory computer-readable medium configured to store a program for causing a control computer embedded in or connected to an interface circuit including a connector for connecting to an electronic device via a cable, to execute:
detecting that the electronic device is not connected to the connector;
displaying an operation mode and a power supply mode being supported by the interface circuit when the detecting detects that the electronic device is not connected to the connector via the cable; and
displaying an established operation mode and an established power supply mode after negotiation with the electronic device connected to the connector via the cable along with the operation mode and the power supply mode being supported by the interface circuit before negotiation.

* * * * *